(12) United States Patent
Liu et al.

(10) Patent No.: US 6,791,753 B1
(45) Date of Patent: Sep. 14, 2004

(54) RETRO-REFLECTIVE FIBER OPTIC INTERLEAVER

(75) Inventors: Yuqiao Liu, Sunnyvale, CA (US); Wei-Shin Tsay, Saratoga, CA (US); Peter Chang, Mt. View, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 45 days.

(21) Appl. No.: 10/101,447

(22) Filed: Mar. 18, 2002

(51) Int. Cl.[7] .......................... G02B 27/28; H04J 14/02
(52) U.S. Cl. .................. 359/498; 359/497; 359/900
(58) Field of Search ............................ 359/497, 498, 359/900

(56) References Cited

U.S. PATENT DOCUMENTS

| | | |
|---|---|---|
| 5,606,439 A | 2/1997 | Wu |
| 5,724,165 A | 3/1998 | Wu |
| 5,978,116 A | 11/1999 | Wu |
| 6,130,971 A | 10/2000 | Cao |
| 6,137,606 A | 10/2000 | Wu |
| 6,335,830 B1 * | 1/2002 | Chang et al. ............... 359/498 |
| 6,563,641 B2 * | 5/2003 | Zhao .......................... 359/495 |
| 6,697,198 B2 * | 2/2004 | Tai et al. ..................... 359/498 |
| 2003/0099013 A1 * | 5/2003 | Su et al. ..................... 359/124 |

* cited by examiner

*Primary Examiner*—John Juba, Jr.
(74) *Attorney, Agent, or Firm*—Joe Zheng; C. P. Chang

(57) ABSTRACT

Fiber optical interleavers based on a retro-reflective structure are disclosed. The retro-reflective structure includes three stages of optical components. A first stage includes walk-off crystals, at least one of the crystals is used to displace a received optical signal with multiplexed bands or channels therein into a first ray (e.g. an O-ray) and a second ray (e.g. an E-ray). A second stage following the first stage includes at least a pair of birefringent crystals to form an interferometer that create path or phase differences introduced by the birefringent index differences between the first ray and the second ray. A third stage following the second stage includes a pair of half wave plates, a walk-off crystal and a quarter wave plate, wherein the quarter wave plate has a highly reflective coating on one end to retro-reflect light beams back through the same stages. Respective reflected and processed first ray and second ray are then combined in the first stage to output respective demultiplexed beams.

18 Claims, 6 Drawing Sheets

(Top view)

(side view)

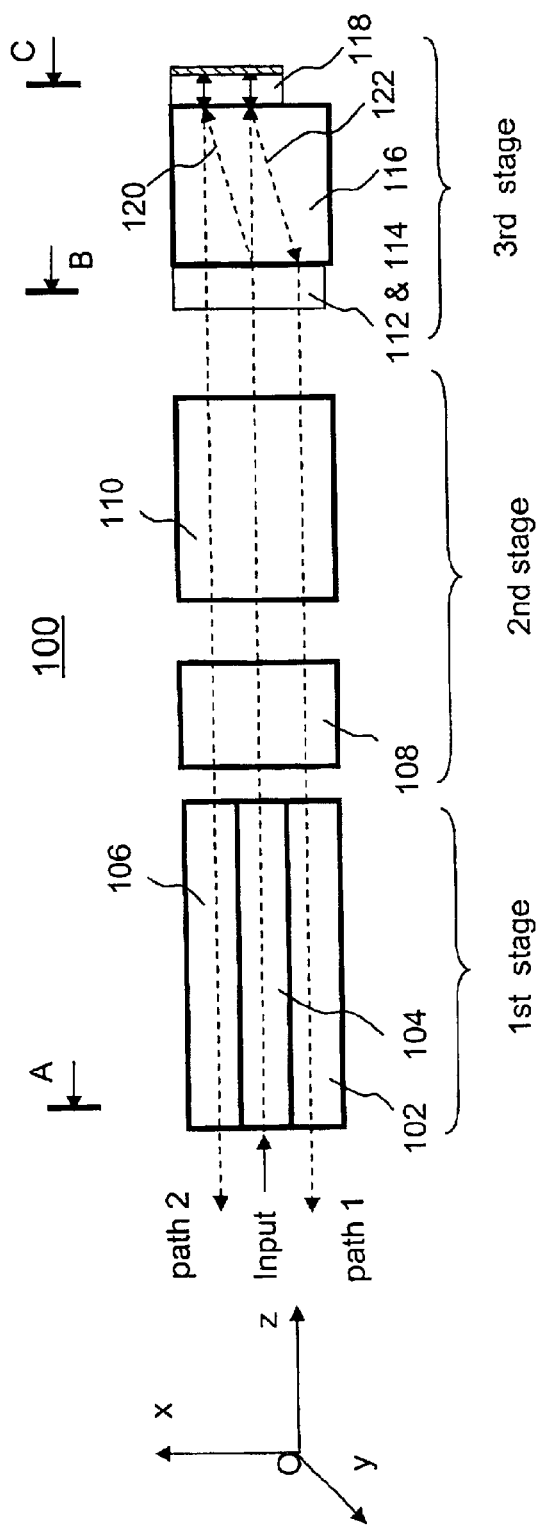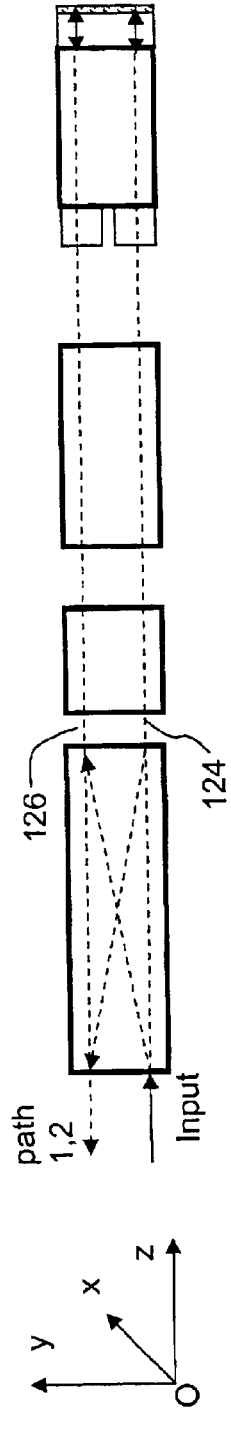
FIG. 1A (Top view)
FIG. 1B (side view)

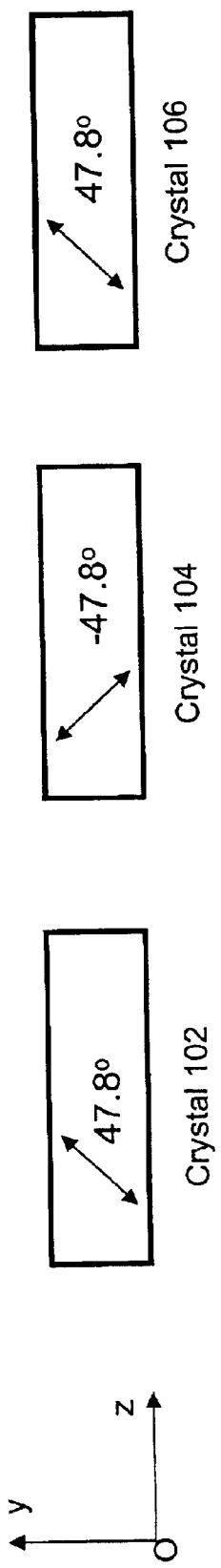
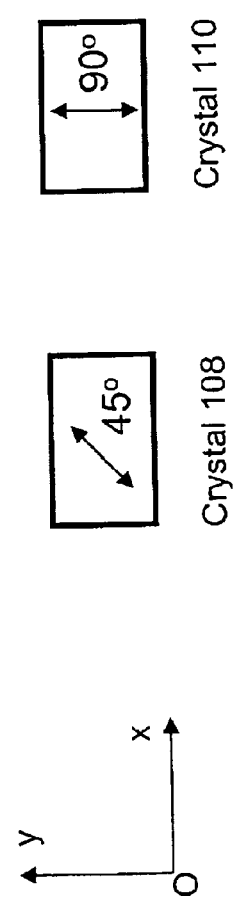
FIG. 2A
FIG. 2B

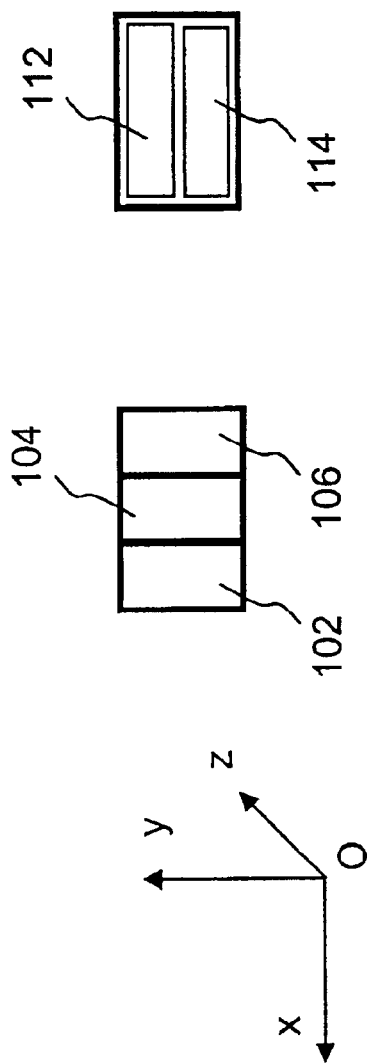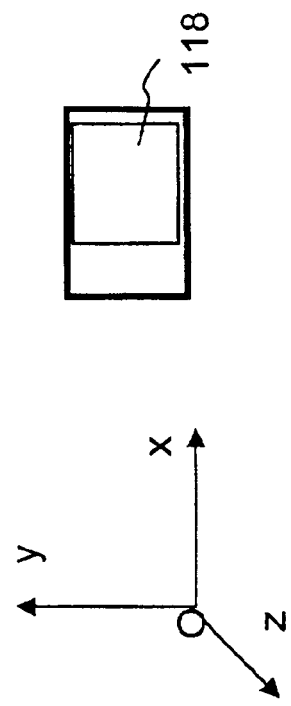
FIG. 3A
FIG. 3B

RETRO-REFLECTIVE FIBER OPTIC INTERLEAVER

CROSS-REFERENCE TO RELATED APPLICATION

This application is related to U.S. patent application Ser. No.: 10/011,584, now U.S. Pat. No.: 6,546,166, and entitled "Multi-stage Optical DWDM Channel Group Interleaver", which is hereby incorporated by reference.

BACKGROUND OF THE INVENTION

1. Field of the Invention

The invention is generally related to the area of optical communications. In particular, the invention is related to improved designs of fiber optic interleavers based on retro-reflective structures.

2. The Background of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths in a single fiber to transmit in parallel different communication protocols and bit rates. Transmitting several channels in a single optical fiber at different wavelengths can multi-fold expand the transmission capacity of the existing optical transmission systems, and facilitating many functions in optical networking.

From a terminology's viewpoint, a device that multiplexes different wavelength channels or groups of channels into one fiber is a multiplexer, and a device that divides the multiplexed channels or groups of channels into individual or subgroups of channels is a demultiplexer. Specifically, when a multiplexer combines two streams of spectrum-periodic optical signals into a single, denser spectrum-periodic signal stream, or in reverse a demultiplexer separates a single spectrum-periodic signal stream into two complementary spectrum-periodic signal streams, such multiplexer/demultiplexer is called an interleaver. Understandably, the spectrum-periodic signal stream is defined in the optical frequency domain and the periodicity is limited within certain optical fiber transmission band. The main function of an interleaver is to separate a channel-continuous spectrum-periodic signal stream into respective spectrum-periodic signal streams or vice versa.

A variety of technologies have been exploited to achieve an interleaver of high performance. Some of the technologies include fused fiber Mach Zehnder interferometer, multi-cavity Fabry Perot interferometer, and polarization interference filters consisting of birefringent crystals. These technologies generally suffer from poor crosstalk between signal channels. Crosstalk means any undesired signal leakage from one channel into another channel. The degradation caused by crosstalk is especially severe when a wide operating wavelength or wide operating temperature range is required, demanding additional active thermal control and resulting in reliability and other concerns. To minimize crosstalk, extremely high quality material and components with tight tolerances are needed. These materials and components increase the overall cost of the interleavers significantly.

Therefore, there is a need for an interleaver that can easily, economically, reliably and precisely demultiplex the desired channels from the multiple channels.

SUMMARY OF THE INVENTION

The present invention pertains to improved designs of fiber optical interleavers based on a retro-reflective structure. The retro-reflective structure includes three stages of optical components. A first stage including walk-off crystals, at least one of the crystals is used to displace a received optical signal with multiplexed bands or channels therein into a first ray (e.g. an O-ray) and a second ray (e.g. an E-ray). A second stage following the first stage includes at least a pair of birefringent crystals to form an interferometer that creates path or phase differences introduced by the birefringent index differences between the first ray and the second ray. A third stage following the second stage includes a pair of half wave plates, a walk-off crystal and a quarter wave plate, wherein the quarter wave plate has a highly reflective coating on one end to retro-reflect light beams back through the same stages. Respective reflected and processed first ray and second ray are then combined in the first stage to output respective demultiplexed beams.

An object of the invention is to provide an interleaver which can easily, economically, reliably and precisely separate desired channels from the multiple channels in an optical signal.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1A shows a top view of a retro-reflective fiber optic interleaver according to one embodiment of the present invention;

FIG. 1B shows a side view of the retro-reflective fiber optic interleaver of FIG. 1A;

FIG. 2A shows the corresponding optical axes orientations of three crystals used in a first stage of the retro-reflective fiber optic interleaver according to one embodiment of the present invention;

FIG. 2B shows the corresponding optical axes of birefringent crystals used in a second stage of the retro-reflective fiber optic interleaver according to one embodiment of the present invention;

FIG. 3A shows a cross sectional view at A, and a cross sectional view at B of the retroreflective interleaver shown in FIG. 1A or FIG. 1B;

FIG. 3B shows a cross sectional view at C of the retroreflective interleaver shown in FIG. 1A or FIG. 1B;

DETAILED DESCRIPTION OF THE PREFERRED EMBODIMENT

Figure 2C:
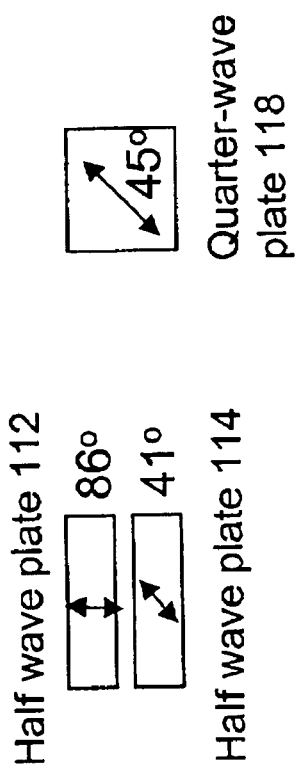
FIG. 2C shows the optical axes of two half wave plates and one quarter wave plate with high-reflective coating used in a third stage of the retro-reflective fiber optic interleaver according to one embodiment of the present invention.

The present invention pertains to improved designs of fiber optical interleavers based on a retroreflective structure.

The retro-reflective structure includes three stages of optical components. A first stage including walk-off crystals, at least one of the crystals is used to convert or displace a received optical signal with multiplexed bands or channels therein into a first ray (i.e. an O-ray) and a second ray (i.e. an E-ray). A second stage following the first stage includes at least a pair of birefringent crystals to form an interferometer that creates path or phase differences introduced by the birefringent index differences between the first ray and the second ray. A third stage following the second stage includes a pair of half wave plates, a walk-off crystal and a quarter wave plate, wherein the quarter wave plate has a highly reflective coating on one side to retro-reflect light beams back through the same stages. Respectively reflected and processed first ray and second ray are then combined in the first stage to output demultiplexed beams or channels. One of the advantages and benefits of the retro-reflective fiber optical interleavers is the ability of separating neighboring channels with a spectrum response profile having a fairly flat bandpass and sharp cutoff slope.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A–4B. However, those skilled in the art will readily appreciate that the detailed description given herein with respect to these figures is for explanatory purposes as the invention extends beyond these limited embodiments.

FIG. 1A shows a top view of a retro-reflective fiber optic interleaver 100 according to one embodiment of the present invention. The interleaver 100 comprises 3 walk-off crystals 102, 104 and 106 in a first stage, 2 birefringent crystals 108 and 110 in a second stage, and 2 half wave plates 112 and 114, a walk-off crystal 116 and a quarter wave plate 118 with a reflective coating on one side in a third stage. The walk-off crystals 102, 104 and 106 may be any suitable crystal with an (optimum) optical axis angled at θ, such as Yttrium Vanadate (YVO4) Crystal that is positive uniaxial crystal grown with Czochralski method. According to one embodiment, both of the crystals 102 and 106 have an identical optical axis angle 47.8 degree and the crystal 104 has an opposit optical axis angle −47.8 degree. FIG. 2A shows respectively the corresponding optical axes orientations of the crystals 102, 104 and 106.

The birefringent crystals 108 and 110 in the second stage form a polarization multi-stage interferometer with the path differences introduced by the birefringent index differences between the O-rays and E-rays. The power splitting ratio into each polarization state is controlled simply by changing the orientations of the eigen polarization directions of the crystals. In a typical application, the path difference of crystal 108 is twice as large as that of the crystal 110, or vice versa. According to one embodiment, the optic axes of the crystals 108 and 110 are located in the xOy plane with angles shown in FIG. 2B.

Figure 4A:
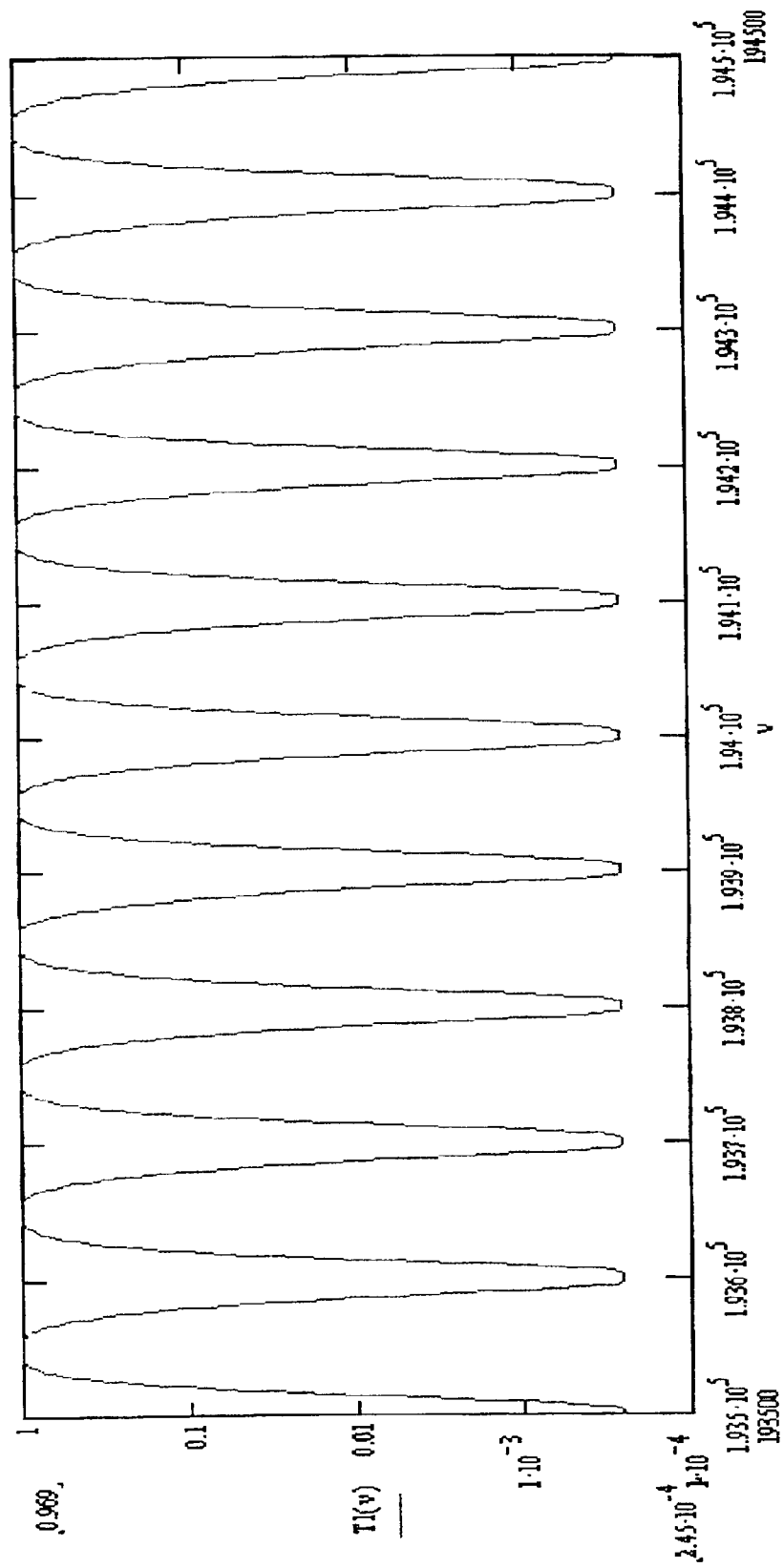
FIG. 4A shows a resultant optical insertion loss spectrum from input to path 1.
Figure 4B:
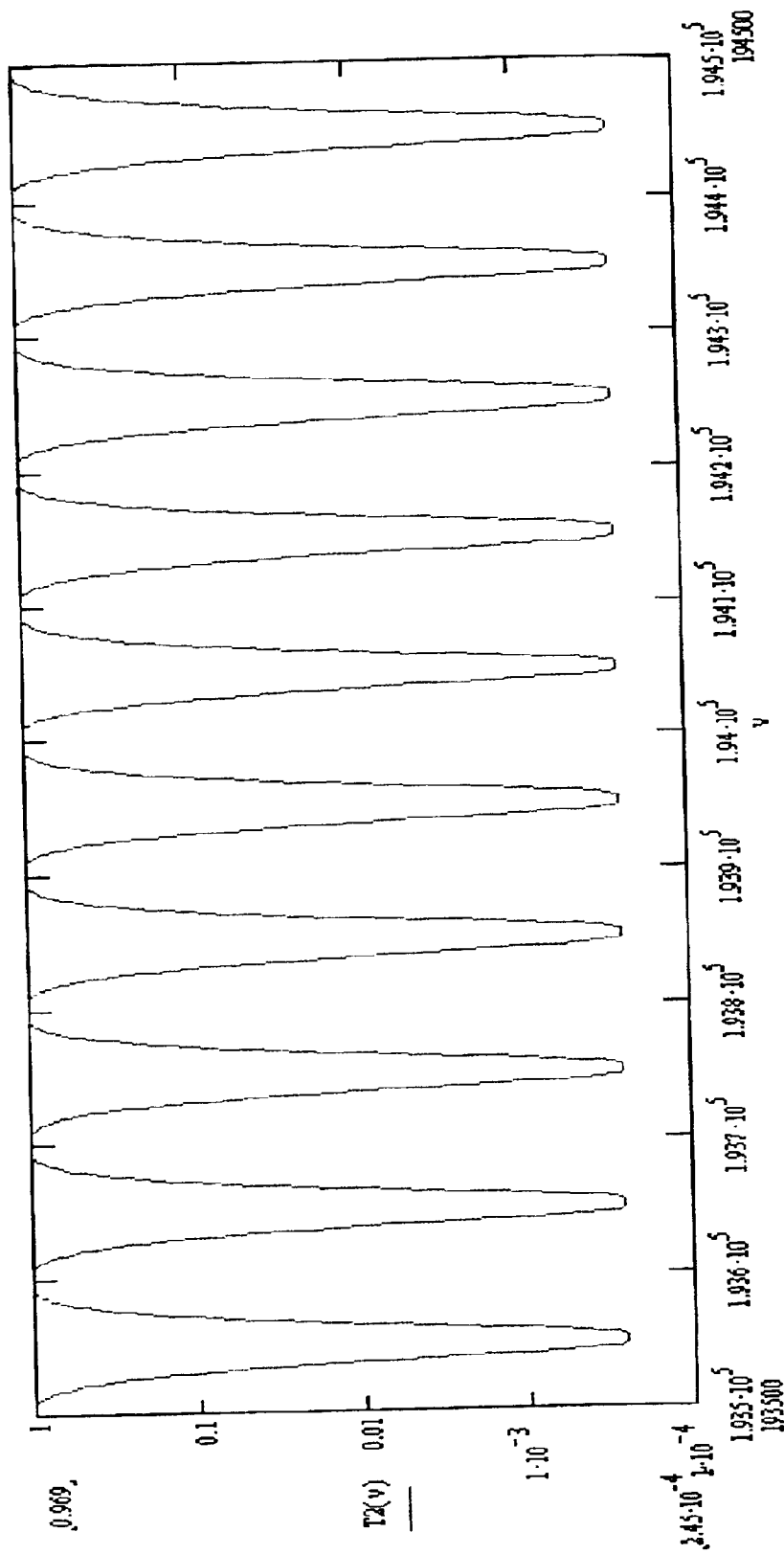
FIG. 4B shows a typical optical insertion loss spectrum from input to path 2.

The half wave plates 112 and 114 in the third stage are used to rotate the polarization of the beams into a proper splitting ratio between the eigen polarization directions of the walk-off crystal 116 performing as a polarization beam splitter. The polarization beam splitter 116 has its optic axis in the xOz plane and separates a light beam into two light beams. The quarter wave plate 118 has a high reflective coating on the outer side. The high reflective coating directs the light beams back through the same crystal sequence again to enhance performance and also save the material. The quarter wave plate 118 works as a half wave plate as the beams pass it back and forth, and converts all E-rays to O-rays or O-rays to E-rays in upper-rays 120 and lower-rays 122, respectively, and vice versa. After retro-passing the same crystal sequences, the upper-rays and lower-rays in the two paths are then recombined into one, respectively, by the walk-off crystals 102 and 106, both now acting as polarization beam splitters/combiners. One of the important features in the retro-reflective fiber optic interleaver 100 is the ability of separating neighboring channels with a spectrum response profile having a fairly flat bandpass and sharp cut-off slope as shown in FIG. 4A and FIG. 4B.

Figure 2D:
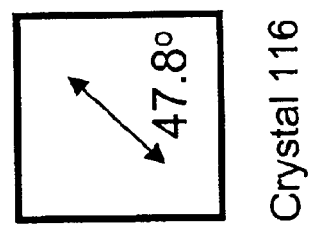
FIG. 2D shows an optical axes orientation of a walk-off crystal used in the third stage of the retro-reflective fiber optic interleaver according to one embodiment of the present invention.

To facilitate the description of the present invention, according to one embodiment, FIG. 2B shows the corresponding optical axes of the birefringent crystals 108 and 110, FIG. 2C shows the optical axis of the half wave plates 112, 114 and a quarter wave plate 118 and FIG. 2D shows an optical axis orientation of the crystal 116. FIG. 3A shows a cross sectional view at A, and a cross sectional view at B of the retroreflective interleaver shown in FIG. 1A or FIG. 1B and FIG. 3B shows and a cross sectional view at C of the retroreflective interleaver shown in FIG. 1A or FIG. 1B.

In operation, a multiplexed light signal or an optical signal (beam) with multiple channels (i.e. DWDM signals) is received at the walk-off crystal 104 that is alternatively referred to as a polarization beam splitter or a beam displacer. When a natural beam transmits through a beam displacer or a walk-off crystal, the beam divides into two rays. One ray transmits crystal straight, named ordinary ray (O-ray); the other one transmits crystal but with a displacement, named extraordinary ray (E-ray). Hence, the crystal 104 divides the optical signal beam into a lower-ray 124 (e.g. O-ray) and an upper-ray 126 (e.g. E-ray), shown in a side view in FIG. 1B. According to the embodiment, the optical axis of the crystal 104 is configured to be −47.8° for YVO4.

Both the lower-ray and upper-ray are now coupled to the birefringent crystals 108 and 110. In one respect, the birefringent crystals 108 and 110 form a polarization multi-stage interferometer that creates path differences introduced by the birefringent index differences between the O-ray and E-ray. In general, to create harmonic path differences, the length of one crystal is longer than that of the other, typically, twice the length or a few integrals thereof. It is possible to add more pairs of birefringent crystals similar to the crystals 108 and 110 if necessary. The power splitting ratio into each polarization state is controlled simply by changing the orientations of the eigen polarization directions of the crystals. According to the embodiment, the optic axes of the crystals 108 and 110 are located in the xoy plane with angles being 45° and 90° respectively, shown in FIG. 2B. As a result, two polarized beams of the lower-ray and two polarized beams of the upper-ray are output from the second stage including one or more pairs of interferometers.

Polarized lower-ray and upper-ray are further coupled to a pair of half wave plates 112 or 114 that are provided rotate the polarization of the beams into a proper splitting ratio between the eigen polarization directions of the walk-off crystal 116 while the walk-off crystal 116 performs a polarization beam splitter. The polarization beam splitter 116 has its optic axis in the xOz plane and separates a light beam into two light beams with eigen polarization directions. Now four light beams (two for each of the upper-ray and lower-ray) travel to a quarter wave plate 118. As there is a highly reflective coating on the end of the quarter wave plate 118, the four light beams are bounced back from the highly reflective coating to the walk-off crystal 116. Essentially, the quarter wave plate 118 works as a half wave plate in view of the bounced beams and converts all E-ray into O-ray and vice versa.

Referring to FIG. 1A, the converted upper-ray and lower-ray travel through the same half wave plates 112 and 114, and at least an interferometer (e.g. 108 and 110). As shown, there are two other crystals 102 and 106 in the first stage, both receiving the converted upper-ray and lower-ray and combining them into a single beam, respectively. Consequently, signals in two neighboring bands are separated.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the foregoing description of embodiments.

We claim:

1. A retro-reflective fiber optic interleaver comprising:
   a first optical stage to displace a received light beam into a first ray and a second ray, wherein the first optical stage includes a walk-off crystal;
   a second optical stage, coupled to the first optical stage and receiving the first ray-and the second ray directly from the walk-off crystal, including at least an interferometer that creates path differences introduced by birefringent index differences in the first and the second ray when the first and the second ray pass straight through the second optical stage, as a result, the second optical stage outputting a processed first ray and a processed second ray; and
   a third optical stage, coupled to the second optical stage through a pair of half wave plates, converting an E-ray to an O-ray and an O-ray to an E-ray, respectively, in the processed first and second rays, and retro-reflecting the converted processed first and second rays back to the second optical stage followed by the first optical stage.

2. The retro-reflective fiber optic interleaver as recited in claim 1, wherein the first optical stage includes three walk-off crystals, one of the three walk-off crystals is the walk-off crystal that receives the received light beam and displaces the received light beam into the first ray and the second ray.

3. The retro-reflective fiber optic interleaver as recited in claim 2, wherein the one of the three walk-off crystals receiving the received light beam is sandwiched between the other two of the three walk-off crystals.

4. The retro-reflective fiber optic interleaver as recited in claim 3, wherein the interferometer in the second optical stage includes a first birefringent crystal and a second birefringent crystal, both coupled in series.

5. The retro-reflective fiber optic interleaver as recited in claim 4, wherein an optical length of the first birefringent crystal is longer than that of the second birefringent crystal.

6. The retro-reflective fiber optic interleaver as recited in claim 4, wherein the birefringent index differences are created respectively by the first birefringent crystal and the second birefringent crystal.

7. The retro-reflective fiber optic interleaver as recited in claim 3, wherein the other two of the three walk-off crystals respectively output two interleaved multichannel signals and wherein each of the two interleaved multichannel signals is converted from a set of the converted processed first ray and second ray bounced back by the third stage.

8. The retro-reflective fiber optic interleaver as recited in claim 2, wherein third optical stage includes at least a pair of half wave plates, a walk-off crystal and a quarter wave plate.

9. The retro-reflective fiber optic interleaver as recited in claim 8, wherein the quarter wave plate has a highly reflective coating on one end to bounce back incoming light beams so that the quarter wave plate works as a half wave plate.

10. The retro-reflective fiber optic interleaver as recited in claim 8, wherein each of the two half wave plates has a different optical axis.

11. A method comprising:
    receiving an optical signal with multiplexed channels therein;
    displacing the optical signal through a walk-off crystal into a first ray and a second ray;
    using at least an interferometer to produce a processed first ray and a processed second ray when the first and the second ray pass straight through least the interferometer by creating sufficient path differences introduced by birefringent index differences in the first ray and the second ray, wherein the interferometer receives the first ray and the second ray directly from the walk-off crystal; and
    coupling the processed first ray and the processed second ray by a pair of wave plates to an assembly including a crystal and a reflector, the wave plates converting an E-ray to an O-ray and an O-ray to and E-ray, respectively, in the processed first and second rays, and the assembly rotating polarizations of the processed first ray and the processed second ray into a proper splitting ratio therebetween.

12. The method as recited in claim 11 further comprising
    retro-reflecting the converted processed first and second rays; and
    producing respective interleaved multichanneled signals converted, respectively, from a set of the converted processed first and second rays.

13. The method as recited in claim 11, wherein the displacing of the optical signal into the first ray and the second ray is performed by an optical assembly including the walk-off crystal.

14. The method as recited in claim 13, wherein the interferometer includes a pair of birefringent crystals, an optical length of one of the birefringent crystals is longer than that of the other one of the birefringent crystals.

15. The method as recited in claim 13, wherein the interferometer includes at least two birefringent crystals, an optical length of one of the two birefringent crystals is a few multiples of that of the other one of the two birefringent crystals.

16. The method as recited in claim 13, wherein the rotating of polarizations of the processed first ray and the processed second ray into the proper splitting ratio comprises including a pair of half wave plates, a walk-off crystal and a quarter wave plate.

17. The method as recited in claim 16, wherein the quarter wave plate has a highly reflective coating on one end to bounce back incoming light beams so that the quarter wave plate works as a half wave plate.

18. The method as recited in claim 16, wherein each of the two half wave plates has a different optical axis.

* * * * *